US012498678B2

(12) United States Patent
Nomula et al.

(10) Patent No.: US 12,498,678 B2
(45) Date of Patent: Dec. 16, 2025

(54) CUSTOMIZING A CONTROL SYSTEM FOR DIFFERENT USE TYPES USING A MACHINE-TRAINED MODEL FOR GENERATING AND THE MODIFYING

(71) Applicant: Microsoft Technology Licensing, LLC, Redmond, WA (US)

(72) Inventors: Jagadeshwar Reddy Nomula, Cupertino, CA (US); Thomas Lawrence Neumark, Point of Rocks, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 454 days.

(21) Appl. No.: 17/991,509

(22) Filed: Nov. 21, 2022

(65) Prior Publication Data
US 2024/0168443 A1 May 23, 2024

(51) Int. Cl.
*G05B 13/02* (2006.01)
(52) U.S. Cl.
CPC ................ *G05B 13/0265* (2013.01)
(58) Field of Classification Search
CPC .................................. G05B 13/0265
See application file for complete search history.

(56) References Cited

U.S. PATENT DOCUMENTS

| 6,112,301 A | 8/2000 | Johnson |
| 10,417,566 B2 | 9/2019 | Sarikaya et al. |
| 11,048,444 B2 * | 6/2021 | Childress .............. G06F 3/0683 |
| 11,301,217 B1 | 4/2022 | Gezen et al. |
| 11,475,413 B2 * | 10/2022 | Bregman .............. G06F 9/5072 |
| 2002/0118223 A1 | 8/2002 | Steichen |

(Continued)

FOREIGN PATENT DOCUMENTS

| CN | 103279392 B | 6/2016 |
| CN | 112256237 A | 1/2021 |

OTHER PUBLICATIONS

"Deep Deterministic Policy Gradient," available at https://spinningup.openai.com/en/latest/algorithms/ddpg.html#:~:text=Deep%20Deterministic%20Policy%20Gradient%20(DDPG,function%20to%20learn%20the%20policy, OpenAI, accessed on Sep. 26, 2022, 10 pages.

(Continued)

*Primary Examiner* — Tammara R Peyton
(74) *Attorney, Agent, or Firm* — Workman Nydegger

(57) ABSTRACT

A technique is described for customizing a control system (e.g., an operating system) of a computing system for different use types. The different use types are associated with different ways of using the computing system. The technique improves performance of computing functions prioritized at a particular time. For instance, the technique improves performance by reducing the number of interruptions experienced by the computing system when executing prioritized applications. Further, in some implementations, the technique dynamically adapts to changing uses over the course of a single computing session. The technique performs this task by dynamically reassessing the use type that most accurately characterizes the current use of the computing system. The technique operates using a discrete computer program, machine-trained functionality, or some combination thereof. Some implementations of the machine-trained functionality use reinforcement learning.

16 Claims, 7 Drawing Sheets

(56) References Cited

U.S. PATENT DOCUMENTS

| | | |
|---|---|---|
| 2009/0013061 A1 | 1/2009 | Winter et al. |
| 2009/0089569 A1 | 4/2009 | Baribault et al. |
| 2009/0254416 A1 | 10/2009 | Nomula |
| 2014/0157422 A1 | 6/2014 | Livshits et al. |
| 2018/0285171 A1 | 10/2018 | Brady et al. |
| 2019/0139092 A1 | 5/2019 | Nomula |
| 2020/0133725 A1 | 4/2020 | Thomas et al. |
| 2021/0124613 A1 | 4/2021 | Goodwin et al. |
| 2021/0233121 A1 | 7/2021 | Nomula |
| 2021/0303607 A1 | 9/2021 | Nomula |

OTHER PUBLICATIONS

Sutton, et al., "Reinforcement Learning: An Introduction," draft version available at progresshttps://web.stanford.edu/class/psych209/Readings/SuttonBartoIPRLBook2ndEd.pdf, 2nd Edition, 2015, MIT Press, 352 pages.

Lillicrap, et al., "Continuous control with deep reinforcement learning," arXiv, Cornell University, arXiv:1509.02971v6 [cs.LG], Jul. 5, 2019, 14 pages.

"Federated learning," available at https://en.wikipedia.org/wiki/Federated_learning, Wikipedia article, accessed on Sep. 26, 2022, 14 pages.

Walpole, et al., "Customizable Operating Systems," available at https://pdxscholar.library.pdx.edu/compsci_fac/30/, Portland State University, University Library, Computer Science Faculty Publications and Presentations, Nov. 1995, 19 pages.

Zhang, et al., "'Learned': Operating Systems," in ACM SIGOPS Operating Systems Review, vol. 53, Issue 1, Jul. 2019, pp. 40-45.

Liu, et al., "Operating Systems for Resource-adaptive Intelligent Software: Challenges and Opportunities," in ACM Transactions on Internet Technology, vol. 21, Issue 2, Article No. 27, Mar. 2021, 19 pages.

Google Patents Translation of CN112256237A, available at https://patents.google.com/patent/CN112256237A/en?pq=CN112256237A, Google Patents, accessed on Sep. 27, 2022, 8 pages.

Google Patents Translation of CN103279392B, available at https://patents.google.com/patent/CN103279392B/en?pq=CN103279392B, Google Patents, accessed on Nov. 17, 2022, 6 pages.

Search Report and Written Opinion for PCT Application No. PCT/US2023/079931, mailing date Feb. 29, 2024, 14 pages.

International Preliminary Report on Patentability in PCT Application No. PCT/US2023/079931, mailed on Jun. 5, 2025, 9 pages.

* cited by examiner

CUSTOMIZING A CONTROL SYSTEM FOR DIFFERENT USE TYPES USING A MACHINE-TRAINED MODEL FOR GENERATING AND THE MODIFYING

BACKGROUND

Developers have traditionally designed operating systems of computing devices to provide adequate service to a broad class of general-purpose users. Once deployed on an individual computing device, an individual user is typically given only limited opportunities to manually change the behavior of the operating system, e.g., through a control panel of the computing device.

SUMMARY

Described herein is a technique for customizing the operation of a control system (e.g., an operating system) of a computing system for different use types. The different use types are associated with different ways of using the computing system. The different ways of using the computing system, in turn, involve different respective uses of resources to which the control system has access. The technique improves performance of prioritized computing functions by increasing the prioritized computing functions' access to the resources, relative to other non-prioritized computing functions.

In some implementations, the technique further dynamically reconfigures the control system to adapt to changing use over the course of a single computing session. The technique performs this task by repeatedly reassessing the use type that most accurately characterizes the current use of the computing system.

In some implementations, the technique uses a discrete computer program to perform its tasks. Alternatively, or in addition, the technique uses a machine-trained model to perform its tasks. In some cases, the technique trains the machine-trained model using a supervised learning approach. Alternatively, or in addition, the technique trains the machine-trained model using a reinforcement learning approach.

The above-summarized technology is described herein as manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing system that optimizes its operating system for different use types. Section B sets forth illustrative methods that explain the operation of the computing system of Section A. Section C describes illustrative computing functionality that, in some implementations, is used to implement any aspect of the features described in Sections A and B.

A. Illustrative Computing System

A.1. Overview

Figure 1:
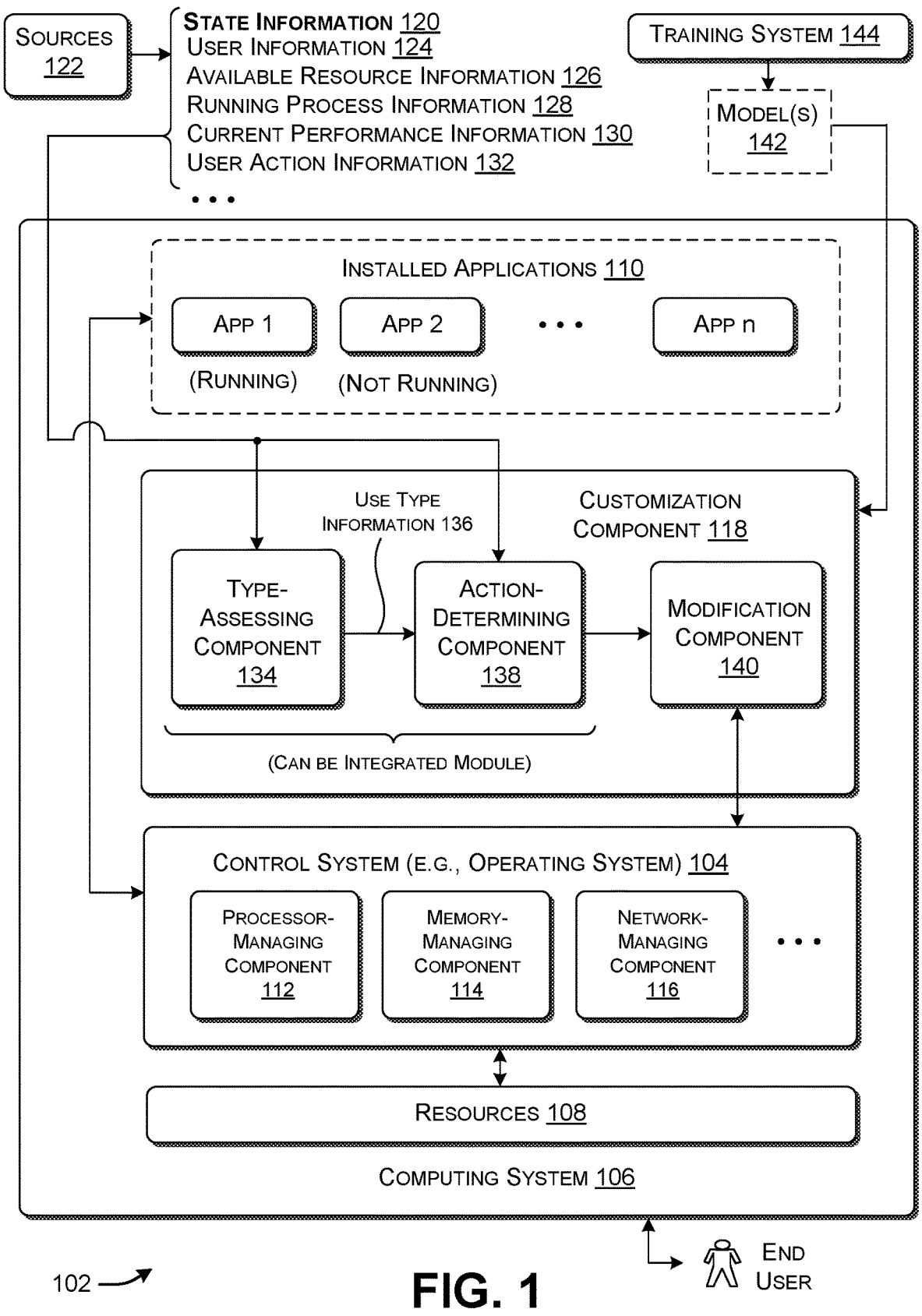
FIG. 1 shows an illustrative configuration environment for customizing operation of a computing system.

FIG. 1 shows one implementation of a configuration environment 102 for customizing a control system 104 of a computing system 106. In some implementations, the computing system 106 includes a local computing device with which an end user interacts, including any of a desktop computing device, a laptop computing device, a handheld computing device of any type (e.g., a smartphone or a tablet-type computing device), a mixed reality device, a wearable computing device, an Internet-of-Things (IoT) device, a gaming system, a media device, a vehicle-borne computing system (such as an autonomous driving system), any type of robot computing system (such as the computing system of a humanoid robot that serves one or more human users), a computing system in a manufacturing system, etc. In other implementations, the computing system 106 is implemented by one or more servers, which, in some implementations, are remotely located with respect to a location of the user. A user device interacts with the server(s) via a computing network. In still other implementations, the computing system 106 is implemented by functionality that is distributed between individual user devices and the server(s). However, to facilitate explanation, the following explanation will most often assume that the computing system 106 represents a local computing device (or devices) with which an individual user interacts.

The control system 104 represents the logic that manages resources 108 of the computing system 106, and that provides services that allow applications 110 to interact with the resources 108. A "resource," as the term is used herein, refers to any element (electronic device, logic component, mechanical part, object within an environment, etc.) to which the control system 104 has access in performing functions of the applications 110. For example, the control system 104 includes a processor-managing component 112 that manages access by running processes to the processor resources of the computing system 106. In some implementations, the processing-managing component 112 performs a scheduling function based on priorities assigned to different processes. A memory-managing component 114 manages access by the running processes to the memory resources of the computing system 106. In some implementations, the memory-managing component 114 also performs page swapping, memory compaction, etc. A network-managing component 116 manages access by the running processes to the network-related resources available to the computing system 106, and so on. In some implementations, the network-managing component 116 grants bandwidth to competing applications. The applications 110 refer to computer programs that are locally installed by the computing system 106 or otherwise accessible to the computing system 106 if they are not locally installed.

In the examples that follow, it is most often assumed that the control system 104 is the operating system of the computing system 106. Examples of commercially-available operating systems include MICROSOFT WINDOWS produced by MICROSOFT CORPORATION of Redmond, Washington and MAC OS produced by APPLE INC. of Cupertino, California. However, the control system 104 encompasses any logic that enables applications to interact with the resources 108 of the computing system 106, regardless of whether this logic is referred to by the manufacturer as an "operating system." For example, the control system 104 encompasses hardware-implemented control logic provided by a home appliance that is not explicitly identified by the manufacturer of the home appliance as an "operating system."

In other examples, the resources 108 more generally represent the features in an environment that are controllable by the control system 104. Such a resource is part of the computing system 106 in some cases, and not a part of the computing system 106 in other cases. For instance, assume that the computing system 106 corresponds to an onboard computing system of a vehicle. The resources in this example include the vehicle's engine and its various parts, the tires, the breaking system, the fuel tank, the steering system, etc. In the case of a robot computing system associated with a robot, the resources include parts of the robot itself that are controllable by the control system 104 (any of its motors, wheels, limbs, etc.) and any objects within the physical environment that the robot is able to control to accomplish the objectives of an application.

The control system 104 performs functions that complement the type of resources which it controls. For instance, in an autonomous driving system, the control system 104 performs functions that include increasing or decreasing the speed of the vehicle, adjusting the course of the vehicle by adjusting its steering system, applying a breaking action via the breaking system, etc.

A customization component 118 modifies the operation of the control system 104 for a particular use of the computing system 106. The customization component 118 performs this function based on state information 120. Broadly stated, the state information 120 describes an environment in which interaction with the computing system 106 is currently taking place. The computing system 106 obtains the state information 120 from various sources 122 using any technique(s), such as a push-based technique, a pull-based technique, or combination thereof. Further, in some implementations, the computing system 106 provides appropriate interfaces (not shown) that enable users to specify the items of information that the computing system 106 is permitted to collect, and the conditions of this collection. The interfaces also enable users to manage the retention of the state information 120 once it is captured. In the example of a vehicle-borne computing system, the state information 120, for instance, describes the state of the engine and its components, the fuel and fluid levels, the tire conditions, the number of passengers in the vehicle, the characteristics of each passenger (which is expressible as any of demographic information, preference information, current physiological state information, etc.), the traffic conditions, other characteristics of the external environment, and so on.

The state information 120 includes various categories of metadata. These parts will be described below, although illustrative implementations need not partition the metadata in the particular manner specified here. For instance, some implementations include data structures that intermix metadata from different categories described below.

In some implementations, one part of the state information 120 contains context metadata 124 that describes the context in which interaction with the computing system 106 is currently taking place. In some implementations, some of the context metadata 124 describes a user profile of a user who is currently interacting with the computing system 106. For example, if available, the context metadata 124 includes an identifier that explicitly identifies the user. In addition, or alternatively, the context metadata 124 specifies the user's age, type of employment, educational level, etc. This information may be explicitly specified in previously-created user profile information available from one or more sources (including online social network applications, administrative data stores, etc.). In addition, or alternatively, the computing system 106 infers this information based on prior selections made by the user. The prior selections include browsing selections, purchases, download selections, etc. In addition, or alternatively, the context metadata 124 specifies a current time, the current location of the computing system 106, etc. In such implementations, the computing system 106 detects the location of the computing system 106 using any position-determining device (e.g., a global positing system device or a terrestrial triangularization device), based on location information provided by the computing network of which the computing system 106 is a part, and so on.

In addition, or alternatively, the state information 120 includes available resource information 126. The available resource information 126 describes the type of computing system 106, as well as any of its resources 108, including the kinds of resources described above. For example, the available resource information 126 specifies how many CPU cores are provided by the computing system 106, its memory capacity, etc.

In addition, or alternatively, the state information 120 includes running process information 128. The running process information 128 describes which of the applications 110 and/or other computing processes are currently running. For instance, FIG. 1 shows that a first application (app 1) is currently running, but that a second application (app 2) is installed but is not currently running. The state information 120 also specifies the running application(s) that are currently receiving input or other interaction from the user, e.g., by via a user input device.

In addition, or alternatively, the state information 120 includes current performance information 130 that measures how well the computing system 106 is currently performing its tasks. As part thereof, the current performance information 130 provides information regarding how well each running process is currently performing its tasks. The computing system 106 expresses performance using any combination of metrics, such failure (error) rate, latency, throughput, consumption of resources, etc. In addition, or alternatively, the computing system 106 measures performance in terms of percentage of completion of a prescribed task, such as a download or upload task, image-rendering task, etc.

In addition, or alternatively, the state information 120 includes user action information 132. The user action information 132 identifies actions that have been explicitly or implicitly taken. For example, in some cases, the computing system 106 receives input from a user that explicitly identifies a use type, selected from among a predetermined set of use types. A "set" refers to a group that includes one or more members. As will be clarified below in the explanation of FIG. 5, the customization component 118 may receive this information from a user in response to the user's interaction with a user interface presentation. In addition, or alternatively, the user action information 132 includes information that describes settings made by the user that adjust the operation of the control system 104. For example, the user action information 132 identifies whenever the control system 104 has been instructed by the user to shut down or otherwise throttle a running process.

The state information 120 is to be understood as flexible, extensible, and environment-specific in nature. Other implementations modify the composition of the state information 120 described above to suit the demands of a particular environment.

FIG. 1 shows that the customization component 118 includes two units that perform their analysis in series. That is, a type-assessing component 134 determines use type information 136 that expresses a use type, and an action-determining component 138 determines what control actions to take based, at least in part, on the use type information 136. This indeed reflects one possible implementation. But in other examples, the type-assessing component 134 and the action-determining component 138 represent functions performed in a more integrated and fused fashion by a single logical component, such as a single machine-trained model. In this case, the computing system 106 does not necessarily expose the use type information 136 as a user-accessible output item; it reflects an internal signal, perhaps representing the output of a layer within a multi-layer neural network. A modification component 140 carries out the control actions specified by the action-determining component 138.

Both the type-assessing component 134 and the action-determining component 138 perform their functions based on the state information 120. By way of terminology, to say that a component X performs its task "based on" a factor Y means that the function that the component X performs depends on the factor Y. For example, if the function is expressible in mathematical terms, the function that the component X performs includes a variable that describes factor Y. If the function is implemented as a machine-trained model, the component X accepts feature information, one part of which expresses the factor Y. If the function is implemented as a computer instruction, the outcome of executing the computer instruction varies depending on the factor Y.

In some implementations, at least part of the customization component 118 is implemented as a lookup table that maps the state information 120 to control actions that are appropriate for the particular composition of the state information 120. In addition, or alternatively, at least part of the customization component 118 is implemented by a computer algorithm expressed by a series of program statements that include, for instance, one or more IF-THEN type statements. In addition, or alternatively, at least part of the customization component 118 is implemented as a machine-trained model 142. In this case, a training system 144 produces the machine-trained model 142 in an offline and/or online manner.

During training, the training system 144 iteratively adjusts the weights of the machine-trained model 142 using any technique, such as stochastic gradient descent in combination with back propagation. As used herein, the term "weight" is shorthand reference for a weight value. Although not explicitly stated in all cases below, the training system 144 is able to also adjust bias values of the machine-trained model 142 during training. Additional information regarding illustrative implementations of the training system 144 appears below in Subsection A.2.

Figure 2:
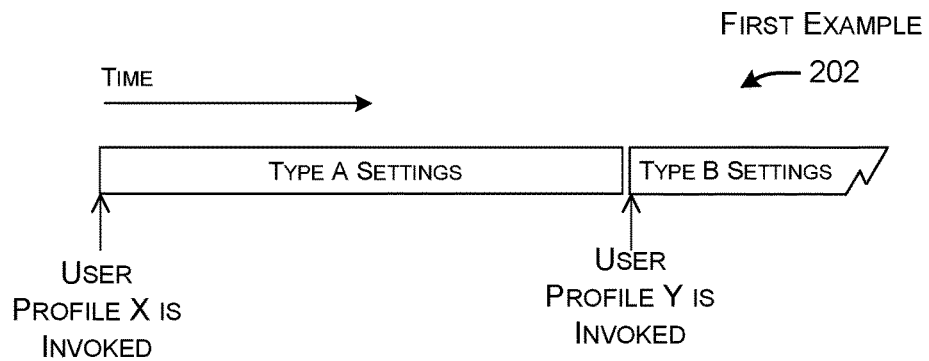
FIG. 2 shows a first example of the use of the computing system of FIG. 1.

FIG. 2 shows a first example 202 of one manner of operation of the computing system 106. Assume here that a computing session begins when a particular user profile X is invoked that is associated with a particular use type. More specifically, in some cases, the particular user profile X is invoked in response to a log in event performed by a particular user associated with the user profile X. Assume that the user profile X is associated with a gaming use type, which is one use type among a set of possible use types. A gaming use type indicates that the computing system 106 will be predominantly used to run game applications. In response to this use type determination, the action-determining 138 identifies the control actions that are appropriate for a gaming use type, e.g., using a lookup table. The modification component 140 then executes the control actions selected by the action-determining component 138.

Assume that the customization component 118 applies the user profile X, associated with the gaming use type, throughout the entirety of a computing session in which the user profile X remains active. The customization component 118 chooses a new use type when another user profile (e.g., user profile Y) is invoked that is associated with another use type, e.g., in response to a log in event performed by another user associated with the user profile Y. Generally, a computing session is a span of time for which a particular user credential remains active in the computing system 106.

Although the user X profile is assumed to be a gaming use throughout the computing session, the action-determining component 138 is able to adjust the control actions to be taken as the state information 120 changes. For example, the action-determining component 138 is configurable to invoke a first set of control actions when a game application G1 is running at the same time as a first non-game application NG1. The action-determining component 138 is configurable to invoke a second set of control actions when the game application G1 is running at the same time as a second non-game application NG2. In other words, the output of the type-accessing component 134 remains constant throughout the computing session in which the user profile X is active, but the output of the action-determining component 138 is capable of dynamically varying based on changes in the state information 120.

The control actions that are taken vary from case to case. In some cases, the customization component 118 provides an instruction that specifies that a selected process will receive a prescribed amount of a particular type of the resources 108 relative to other processes, such as available CPU cycles or available memory. In some examples, the customization component 118 achieves this result by outright shutting down one or more running processes. In addition, or alternatively, the customization component 118 achieves this result by throttling (e.g., reducing) the amount of resources 108 an identified process is able to use.

In addition, or alternatively, the customization component 118 provides instructions that control the priority at which a process runs relative to another process. In addition, or alternatively, the customization component 118 provides instructions that control the kind of resource that a particular process is allowed to use. For example, in some cases, the computing system 106 provides a hierarchy of storage devices, ranging from the most readily accessible (e.g., CPU memory) to the least readily accessible (e.g., disk storage). The customization component 118 specifies to what extent a particular process is allowed to interact with a particular layer or layers of this hierarchy. Other examples of control actions are expressible in conditional IF-THEN form, meaning that the access rights depend on plural factors. In the particular case of first example 202, assume that the customization component 118 gives an identified gaming application privileged access to processor and memory resources. Further assume that the customization component 118 shuts down competing resource-intensive processes, such as a firewall program and a video-streaming application.

In yet other types of environments, the control action affects the resources that may not be a part of the computing system 106 per se. For example, in a vehicle, one kind of control action instructs a breaking system to apply a breaking action. Another control action instructs a steering system to adjust the directional course of the vehicle, and so on.

The modification component 140 conveys its instructions in variety of different ways. In some cases, the modification component 140 specifies one or more parameter values to be changed in the control system 104. In some cases, the modification component 140 specifically identifies the applications to be shut down or throttled. In some cases, the modification component 140 identifies rules to be invoked or discontinued, and so on.

Note that, in many of the examples presented herein, a "use type" describes the manner in which the computing system 106 is being used in response to interaction with the computing system 106 by a particular human user. However, an entity that invokes the functions of the computing system 106 need not be a single human user. In other cases, for instance, the entity is another computing system that invokes the services of the computing system 106. In other cases, the entity is a group of human users, and so on. As such, the term "user" as used herein is intended to generally encompass any entity that uses the computing system 106 to perform application functions.

Figure 3:
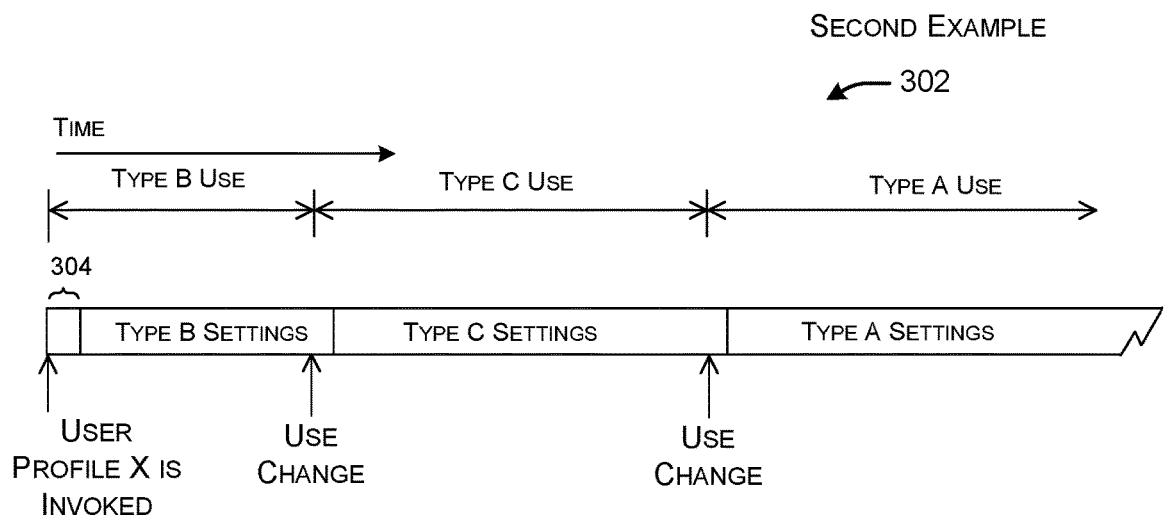
FIG. 3 shows a second example of the use of the computing system of FIG. 1.

FIG. 3 shows a second example 302 in which the customization component 118 dynamically varies the use type during a single computing session based on plural factors in the state information 120. Assume that, when the user profile X is first invoked, the customization component 118 initially selects a default use type, such as a general use type, and identifies the control action(s) that are appropriate to this use type. Alternatively, the customization component 118 selects a default use type specified by the user profile X. Assume that the customization component 118 considers the default use type to remain in effect for a time span 304. At the end of that period of time, the customization component 118 detects that the use type has changed. The customization component 118 then identifies the control action(s) that are appropriate to the new use type. Note that there may be a lag between the use type changing and the customization component 118 detecting that the use type has changed. The above process of dynamically detecting and applying use types continues throughout the computing session. In some cases, the customization component 118 detects a new use type in response to new applications being invoked and/or previously running applications being closed. More generally, however, the type-assessing component 134 is capable of making its use type determination based on plural factors specified by the state information 120.

Figure 4:
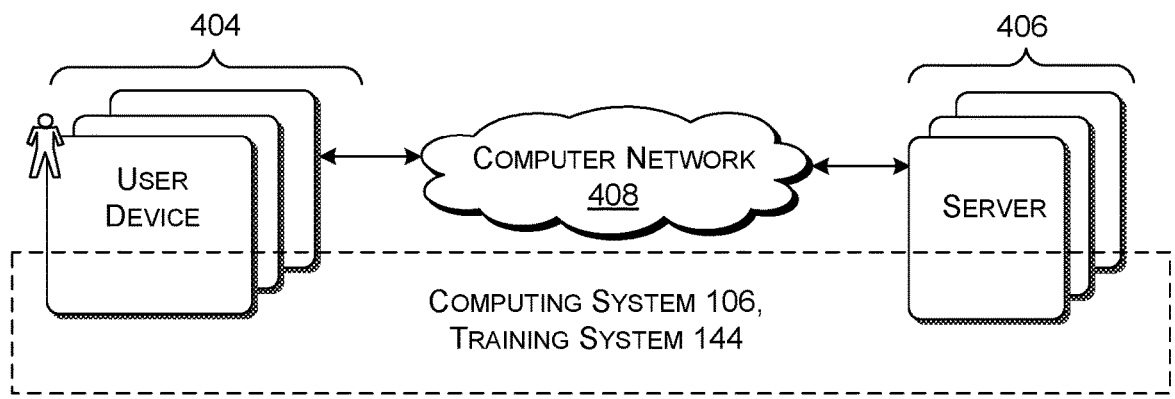
FIG. 4 shows illustrative equipment for implementing the configuration environment of FIG. 1.

FIG. 4 shows an example of computing equipment 402 that, in some implementations, is used to implement aspects of the configuration environment 102 of FIG. 1. The computing equipment 402 includes a set of user devices 404 coupled to a set of servers 406 via a computer network 408. Each user device corresponds to any one or more of the types of devices described above in connection with FIG. 1. In some examples, the computer network 408 is implemented as a local area network, a wide area network (e.g., the Internet), one or more point-to-point links, or any combination thereof.

The dashed-line box shown in FIG. 4 is meant to generally indicate that the computing system 106 of FIG. 1 is capable of being implemented in different ways. For instance, in some implementations, an individual user device (or devices) implements the computing system 106, without relying on any logic provided by the servers 406. In network-based (e.g., "cloud-based") implementations, the servers 406 implement the computing system 106. Here, an individual user device uses a browsing program (not shown) to interact with the computing system 106 implemented by the servers 406. In still other cases, the logic of the computing system 106 is distributed between an individual user device and the servers 406 in any manner.

Similarly, the dashed-line box in FIG. 4 also indicates that functionality of the training system 144 is capable of being spread across the user devices 404 and/or the servers 406 in any manner. For instance, in some cases, an individual user device implements a local version of the training system 144. Here, the servers 406 do not play any role in the training performed by the training system 144. In other implementations, one or more of the servers 406 implement the entirety of the training system 144. Here, in some implementations, an individual user device receives a trained model that is produced by the servers 406, but the individual user device does not perform any local training. In other cases, the functionality associated with the training system 144 is distributed between the servers 406 and each user device in any manner.

Figure 5:
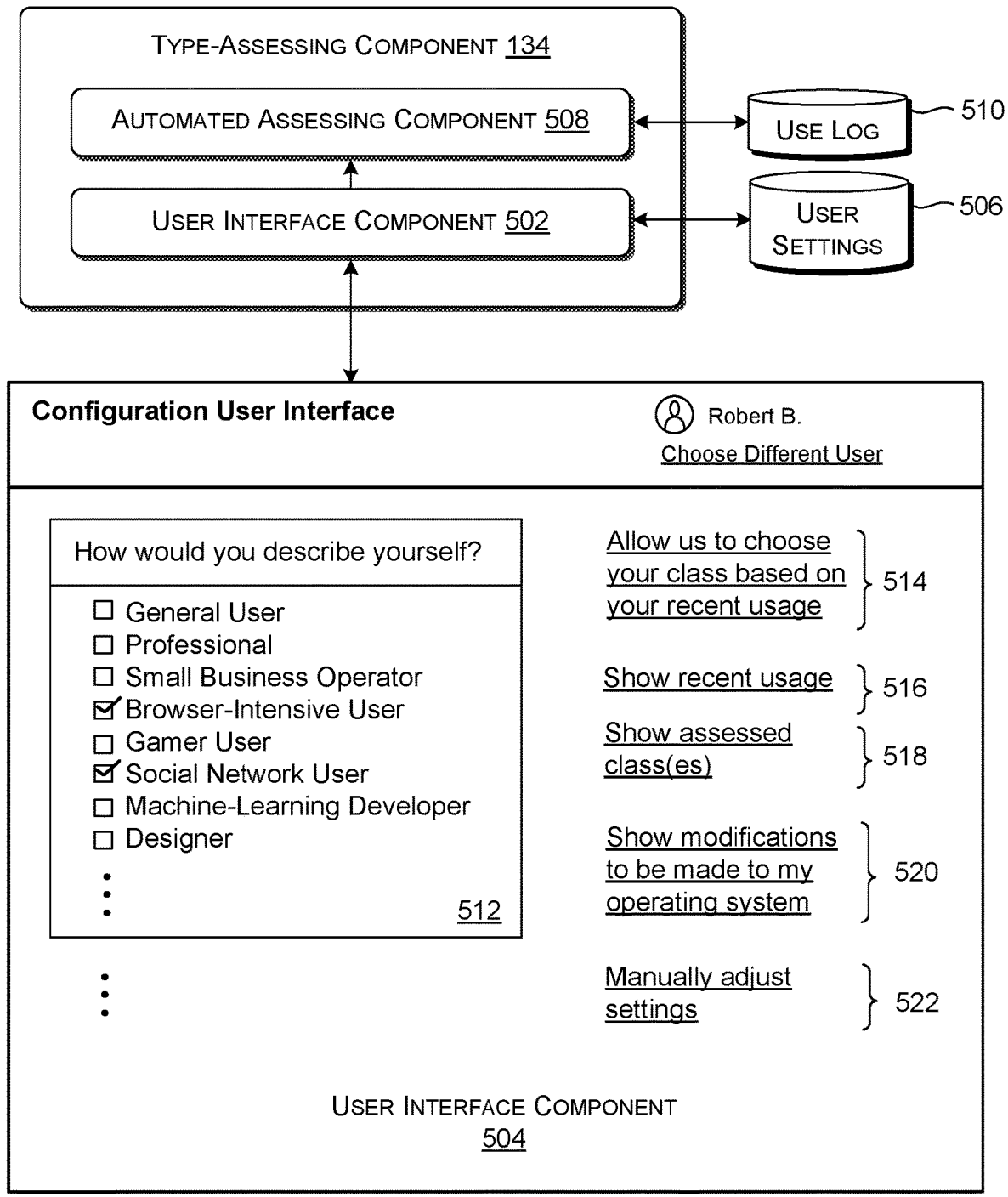
FIG. 5 shows illustrative details regarding a type-assessing component, which is one part of the computing system of FIG. 1.

FIG. 5 shows one implementation of the type-assessing component 134 of FIG. 1. A user interface component 502 is configured to receive a user's selection of a use type or types via a user interface (UI) presentation 504. The user interface component 502 stores the selection in a data store 506. An automated assessing component 508 automatically selects the use type based on one or more factors specified in the state information 120 and/or based on historical use patterns described in a data store 510.

In some implementations, the UI presentation 504 includes a graphical control 512 that allows selection of a use type or types that most appropriately characterizes the way that the computing system 106 is most often used by the user. Illustrative use types include: general use; professional use; small business use; browser-intensive use; gaming use; program creation use; design-related use, etc. In some cases, any two use types are mutually exclusive. In other cases, any two use types are not mutually exclusive. In some implementations, a backend analysis component (not shown) chooses a group of use types by performing clustering analysis on descriptors (e.g., vectors) that describe different instances of application-consuming behavior.

Some of these use types broadly characterize an occupation for which the computing system 106 is expected to be used. For instance, a professional use involves use of the computing system 106 in the course of professional tasks (such as conducting medical tasks or performing legal tasks). In some examples, this type of use is expected to prioritize the use of a video-conferencing application (for instance), such as the TEAMS application provided by MICROSOFT CORPORATION. A small business use is a use of the computing system 106 in the course of running a small business, such as store. In some examples, this type of use is expected to prioritize accounting programs, spreadsheet programs, point-of-sales applications, and so on.

Other use types directly characterize the activities that are expected to be frequently performed using the computing system 106. For instance, a browser-intensive use is expected to frequently use the computing system 106 to browse network-accessible (e.g., Web-based) content. A gaming use is expected to frequently use the computing system 106 in the execution of game applications. A program creation use is expected to frequently use the computing system 106 to develop computer programs. A machine-learning use is expected to frequently use the computing system 106 to develop machine-trained models. A design-related use is expected to frequently use the computing system 106 to develop other types of content, including graphics, movies, songs, etc. A general-purpose use is expected to use the computing system 106 for various tasks, without emphasizing any particular computing function. In the case in which the selections in the UI presentation 504 are made by a particular user, that particular user can self-assess what constitutes "frequent" use of a certain application function, and thus, what use type(s) are appropriate selections to describe their behavior.

In some cases, use types will be selected via the graphical control 512 and thereafter left in place throughout an extended use of the computing system 106, e.g., extending over several computing sessions. This is the case with the first example 202 of FIG. 2. In other cases, use type settings will be changed via the graphical control 512 on a more frequent basis to describe changing uses. For example, consider the case in which the same computing device is used in work and home environments. Use type selections may be changed via the graphical control 512 whenever the nature of computer use is expected to change. In still other cases (not shown in FIG. 5), the user interface component 502 receives input information that specifies those spans of time for which different use types are considered to be in effect.

The automated assessing component 508 automatically chooses use type(s) on a dynamic basis, eliminating the need for interaction with the graphical control 512, or supplementing such interaction. In some implementations, the automated assessing component 508 is invoked in response to selection of the graphical control 514 in the UI presentation 504. In some examples, the automated assessing component 508 is implemented in local fashion by the computing system 106. In other cases, the automated assessing component 508 is, at least in part, provided by a remote system implemented by one or more servers. In other examples, the automated assessing component 508 takes into consideration, as one factor among possible other factors, a use type explicitly selected via the user interface component 502; but here, the use type that is selected is not the sole factor that controls the behavior of the control system 104.

In some implementations, as one factor, the automated assessing component 508 chooses the use type(s) based on the use state of the applications, where the use state of an application describes an extent to which the application is currently being used by the computing system 106. In making this determination, the automated assessing component 508 draws a distinction between those applications that are being actively manipulating using a user input device (referred to herein as "in-focus applications"), those applications that are running but are not being currently manipulating using a user input device, and those applications that are not currently running but are installed by the computing system 106 or otherwise accessible to the computing system 106. In addition, or alternatively, the automated assessing component 508 takes into consideration the z-order of windows presented on a user interface presentation; an in-focus application most likely corresponds to the top-most window in a stack of windows presented on the user interface presentation. The automated assessing component 508 gives the highest priority to those applications that are currently being actively manipulating using an input device or the applications that are otherwise being actively used, as assessed with respect to any environment-specific standard as to what constitutes "active use."

In addition, or alternatively, the automated assessing component 508 examines a use log in a data store 510 that stores information regarding how the user's computing system 106 has been used over a prescribed period of time, such as the last six months. From this use log, the automated assessing component 508 determines the kind of applications that have received the most interaction. In some implementations, the automated assessing component 508 uses this knowledge to influence its current selection of use type, e.g., by selecting the use type that matches the prior interest(s) exhibited by the prior use, or by using the prior use as one factor in choosing the use type. The automated assessing component 508 is capable of performing its analysis with respect to all use of the computing system 106, potentially by plural users, or with respect to use of the computing system 106 by a single identified user. The computing system 106 identifies an entity that is interacting with it at any given time based on various evidence, such as credential information entered by the entity upon log in. The automated assessing component 508 is also capable of taking into consideration any of the above-described characteristics of a user profile in determining a use type, including user age, occupation, gender, etc.

In one illustrative example, the automated assessing component 508 operates by forming a feature vector that describes features specified by at least part of the state information 120. Assume that the computing system 106 is associated with a particular user who is the sole entity which interacts with it. In some examples, the feature vector expresses how frequently prescribed computing functions have been performed by the computing system 106. The feature vector also flags those applications that are currently receiving attention from the particular user, e.g., as evidenced by user input from the particular user. In addition, or alternatively, the feature vector describes any of the demographic characteristics in a user profile of the particular user, examples of which are set forth above. The automated assessing component 508 maps this feature vector into a latent type vector in a vector space that semantically characterizes the use type (of use types) of the computing system 106 at the present time. In some cases, the automated assessing component 508 uses any type of machine-trained model to perform this mapping, such as any type of neural network that generates output logits, and any type of classification layer(s) that maps the output logits to a classification result. One example implements the neural network as a transformer-based neural network, and implements the classification layer as a Softmax function (i.e., a normalized exponential function) that operates on output logits produced by the transformer-based neural network. The automated assessing component 508 generates the type vector based on any timing considerations, such as on a periodic basis and/or on an event-driving basis (e.g., based on an indication that the feature vector has changed in a prescribed manner).

In some implementations, the action-determining component 138 (of FIG. 1) generates control settings based on the type vector generated by the automated assessing component 508 and other aspects of the state information 120. As a preliminary operation, in some implementations, the action-determining component 138 produces an input vector based on the type vector and the state information 120, e.g., by combining (e.g., concatenating) the type vector with a state vector that is generated based on the state information 120.

In some implementations, actuation of graphical control 516 causes the user interface component 502 to present an editable summary of the prior use of applications. This summary reflects, for instance, prior use that is expressed in the use log in the data store 510. The user interface component 502 presents this summary in any form, including a table, a bar chart, a pie chart, etc. In some examples, in response to editing instructions, the user interface component 502 removes activities that do not accurately describe the usual way in which the computing system 106 is used.

Actuation of the graphical control 518 causes the user interface component 502 to show the use type(s) automatically chosen by the automated assessing component 508. In response to editing instructions, the user interface component 502 modifies the selected use type(s), e.g., by adding and/or removing use types.

Actuation of the graphical control 520 causes the user interface component 502 to show the modifications that will be made to the control system 104, based on the use type(s) that have been selected. In response to actuation of the graphical control 522, the user interface component 502 adjusts any settings, deletes settings, adds new settings, and so on.

Other implementations of the UI presentation 504 differ from the above-described example in any number of ways, including: a) providing different graphical controls compared to that shown in FIG. 5; providing a different arrangement of graphical controls compared to that shown in FIG. 5; exposing a different set of selection options compared to the set shown in FIG. 5, and so on.

A.2. The Training System

Figure 6:
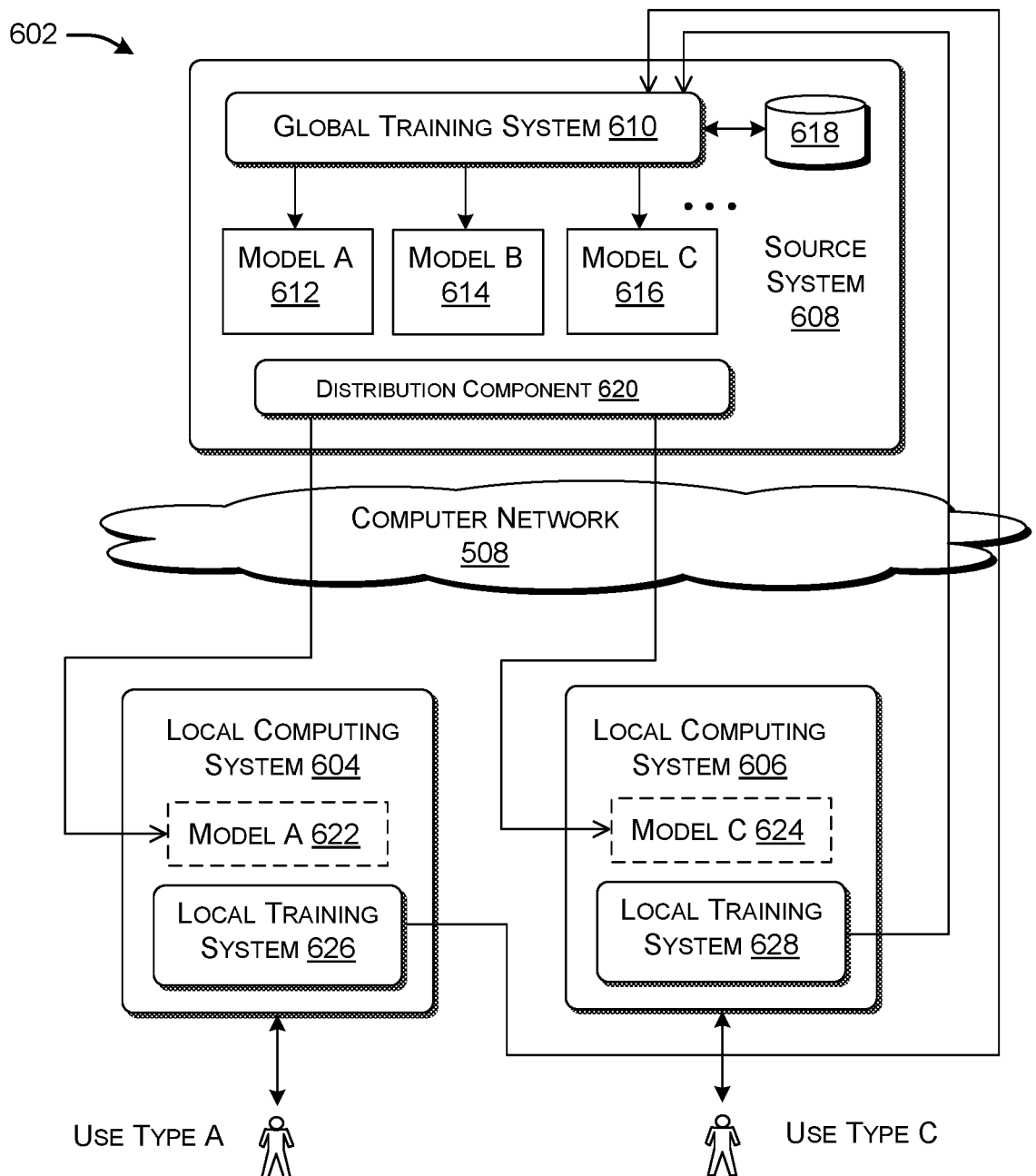
FIG. 6 shows a distributed training framework for training a machine-training model used by the computing system of FIG. 1.

FIG. 6 shows a training framework 602 for producing the machine-trained model 142. In some implementations, the training framework 602 includes a plurality of local computing systems (604, 606, etc.) and a sever-implemented source system 608. The source system 608 includes a global training system 610 that produces different types of models (model A 612, model B 614, model C 616, etc.) based on training examples in a data store 618. A distribution component 620 downloads an appropriate version of the machine-trained model to each local computing system via the computer network 408, depending on the use type that is currently being invoked by the local computing system 604. The distribution component 620 initiates the downloading of an appropriate version of a machine-trained model in response to any of: a) the production of an updated version of this model by the global training system 610; b) an explicit request for the latest version of the model; and/or c) an initialization routine that is performed upon initialization of a local computing system.

In the specific example of FIG. 6, a use type A is currently being invoked by the local computing system 604. In response, the local computing system 604 receives a version of the model A 612 produced by the global training system 610, referred to in FIG. 6 as model A 622. A use type C is currently being invoked by the local computing system 606. In response, the local computing system 606 receives a version of the model C 616 produced by the global training system 610, referred to in FIG. 6 as model C 624. In some implementations, each local computing device uses its downloaded version of the machine-trained model without modification.

In other implementations, each local computing device uses a local instance of the training system to further train the weights of its downloaded version of the machine-trained model. For instance, the local computing system 604 includes a local training system 626 for further training the machine-trained model A 622 based on additional training examples produced in the course of using the local computing system 604. Similarly, the local computing system 606 includes a local training system 628 for further training the machine-trained model C 624 based on additional examples produced in the course of using the local computing system 606.

Although not shown in FIG. 6, each local training system includes an upload component for uploading the refined weights it produces to the source system 608, which stores the refined weights in the data store 618. In some examples, the global training system 610 then uses any federated learning strategy to update the weights of the machine-trained model A 612, machine-trained model B 614, machine-trained model C 616, etc. Consider the case of the machine-trained model A 612 produced by the global training system 610. The global training system 610 operates by: a) receiving local instances of refined weights produced by the local training systems for computing systems associated with A-type use; b) summing the local instances of refined weights to produce a global instance of updated weights; and c) using the global refined weights to update the machine-trained model A 612. In some implementations, the termination of this process triggers the distribution component 620 to download the updated version of the machine-trained model A 612 to all computing systems in which the A-type use is being invoked.

In yet other implementations, the global training system 610 produces a single global machine-trained model (not shown) for all use types. The distribution component 620 downloads the global training system 610 to all local computing systems. Each local computing system then uses its local training system to customize the global machine-trained model based on the patterns of activities exhibited by a particular use.

In some implementations, a global machine-trained model produced by the global training system 610 and distributed to the local computing systems (604, 606, etc.) is specifically designed to invoke different sets of control settings and configurations that are appropriate for different use types. This implementation is particularly suitable for use in connection with the automated assessing component 508 of FIG. 5. Here, the iterative learning further refines the configurations that are chosen for different use types, e.g., by further refining what control settings are appropriate when the use of a computing device exhibits a pattern consistent with a gaming profile. In illustrative examples, this iterative learning is performed in the global training system 610 and/or in each local computing system.

Figure 7:
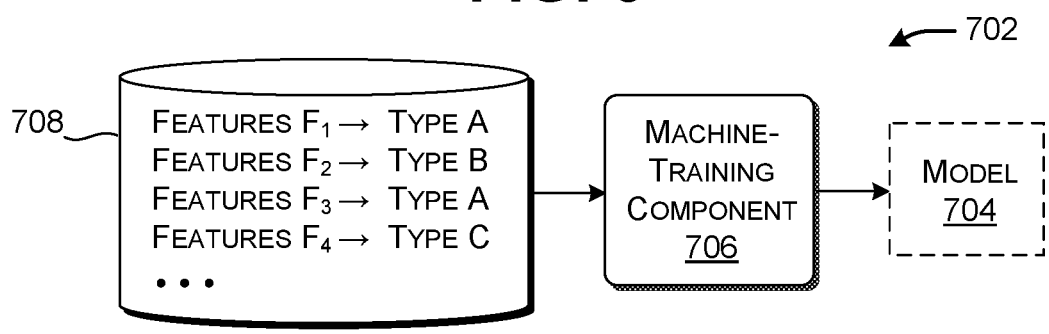
FIGS. 7 and 8 show illustrative training systems that use supervised learning to generate machine-trained models for use by the computing system of FIG. 1.

FIG. 7 shows a training system 702 that uses supervised learning to produce a machine-trained model 704 for use by the type-assessing component 134 of FIG. 1. The training system 702 includes a machine-training component 706 that iteratively generates the machine-trained model 704 based on training examples in a data store 708. Each positive training example specifies a particular set of features and a use type that is appropriate for the set of features. For example, in some cases, the set of features associated with a particular user profile describes an age, an educational level, a type of employment, frequently-used applications, and so on. Each negative example includes a set of features and a use type that has been assessed as inaccurate. The machine-training component 706 performs training by iteratively reducing the differences between the classifications made by the machine-training component 706 and the ground-truth classifications in the data store 708. In real-time production use, the machine-trained model 704 maps the features expressed in the state information 120 to a particular use type that is appropriate for the features.

Figure 8:
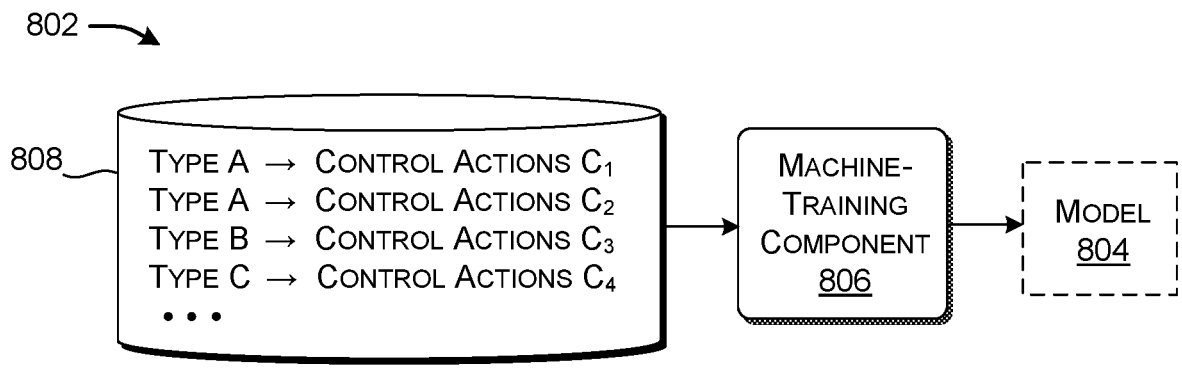

FIG. 8 shows a training system 802 that uses supervised learning to produce a machine-trained model 804 for use by the action-determining component 138 of FIG. 1. The training system 802 includes a machine-training component 806 that iteratively generates the machine-trained model 804 based on training examples in a data store 808. Each positive training example specifies a use type and a set of control settings manually (or automatically) chosen for that use type. For example, in some cases, a control setting for a gaming use specifies that it is appropriate to shut down a browser application when a game is being played. Each negative example includes a use type and control settings that are incorrect for this use type. The machine-training component 806 performs training by iteratively reducing the differences between the control settings chosen by the machine-training component 806 and the ground-truth control settings in the data store 808. In real-time production use, the machine-trained model 804 maps a use type to a set of control actions that are appropriate for the use type.

In other implementations, a training system (not shown) uses supervised learning to train a single machine-trained model for the type-assessing component 134 and the action-determining component 138 that fuses the functions of the above two machine-trained models (704, 804). In real-time production use, the single machine-trained model maps features specified by the state information 120 to control actions that are appropriate for a use type associated with the state information 120. This machine-trained model need not explicitly generate an output result that specifies the use type associated with each use. However, in some examples, a layer of the machine-trained model produces output results that implicitly express the use type.

Figure 9:
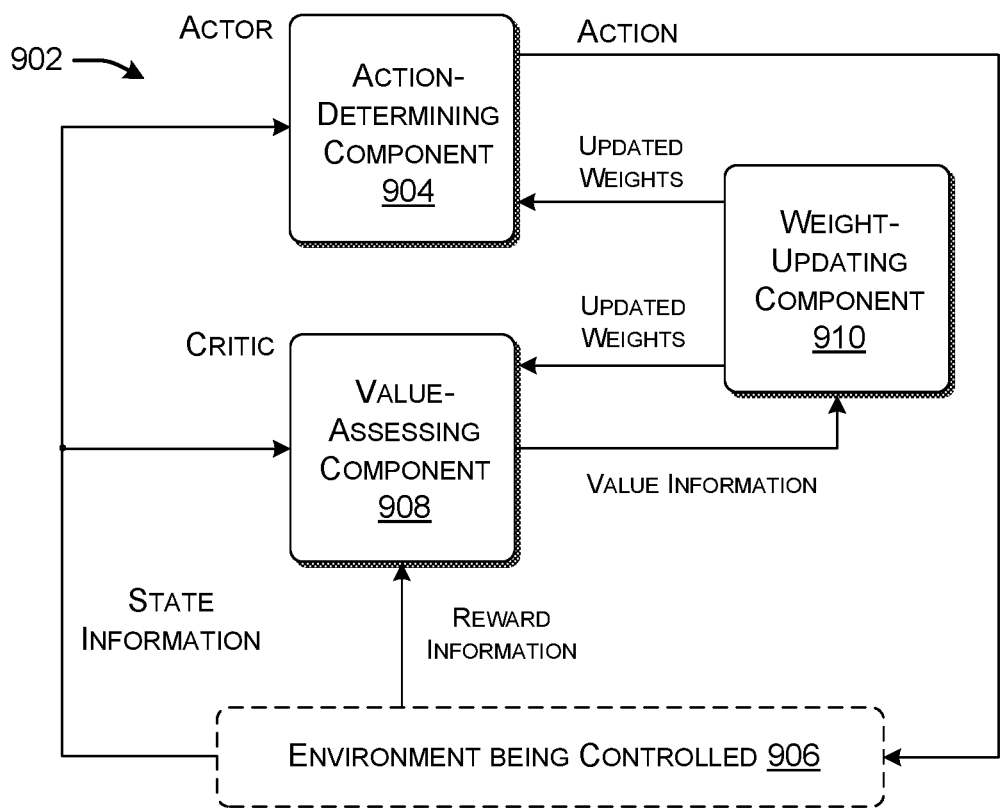
FIG. 9 shows an illustrative training system that uses reinforcement leaning for training a machine-trained model for use by the computing system of FIG. 1.

FIG. 9 shows an illustrative training system 902 that uses reinforcement learning to train a machine-trained model. The training system 902 includes an action-determining component 904 for determining an action to take within an environment 906 based on state information. The state information reflects a current state of the environment 906 at a current time. The action will have various positive and/or negative consequences within the environment 906, as expressed by reward information. A value-assessing component 908 generates value information, which expresses a measure of how useful the action selected by the action-determining component is in advancing a system being controlled towards a desired objective. For example, in an autonomous driving system, one objective is to reach a specified destination. Here, the value information expresses how useful a change to the vehicle's control system is in advancing the vehicle towards the specified destination. In this regard, the value-assessing component 908 operates as a critic of the action-determining component 904. In some implementations, the action-determining component 904 and the value-assessing component 908 are implemented by respective neural networks, each of which includes a set of machine-trained weights. A weight-updating component 910 adjusts the weights of the value-assessing component 908 and the action-determining component 904 based on the value information generated by the value-assessing component 908.

In the context of the configuration environment of FIG. 1, the state information shown in FIG. 9 includes the items of information specified above for the state information 120. The action specified by the action-determining component 904 corresponds to a control setting that affects the operation of the control system 104. The reward information measures an extent to which the control setting that has been made allows desired tasks to be performed without interruption. For instance, consider a gaming use. In some examples, the reward information assesses the ability of the computing system to run game applications without interruptions (e.g., program hang-ups) or any other degradations in performance. In some implementations, the training system 902 assigns a positive reward point for each time interval that play proceeds without a program stall or other identified degradation in play quality. The training system 902 assigns a negative reward point when it detects that manual changes have been made to the control settings to address substandard performance of the computing system 106, e.g., by shutting down or throttling a competing application. In addition, or alternatively, the training system 902 expresses a level of engagement using any metric or combination of metrics, including throughput, percent completion of a task, latency, memory contention, cache miss rate, etc. In addition, or alternatively, the training system 902 is capable of taking into account more indirect user feedback, such as comments made about an application in a social network.

Figure 10:
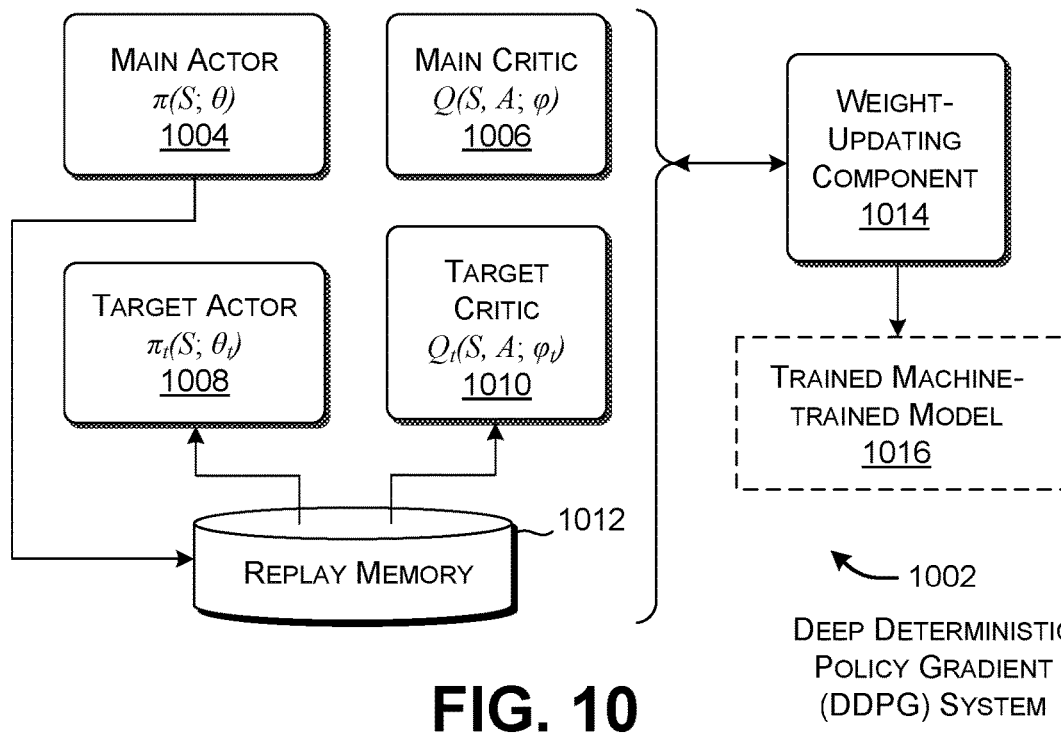
FIG. 10 shows one implementation of the training system of FIG. 9.

FIG. 10 shows one implementation of a deep deterministic policy gradient (DDPG) system 1002, which represents one particular implementation of the training system 902 of FIG. 9. The DDPG system 1002 includes a main actor 1004 and a main critic 1006. The main actor 1004, mathematically expressed as $\pi(S;\theta)$, maps state information S into an action A that is expected to maximize rewards. The main actor 1004 is implemented by a neural network which is configured by a set of weights $\theta$. The main critic 1006, mathematically expressed as $Q(S,A;\phi)$, maps state information and action A into a measure of expected long-term reward. The main critic 1006 is implemented by a neural network that is configured by a set of weights $\phi$.

The DDPG system 1002 also includes a target actor 1008 and a target critic 1010, which are counterparts of the main actor 1004 and the main critic 1010. The DDPG system 1002 includes the target actor 1008 and the target critic 1010 to help stabilize the learning that is performed by the DDPG system 1002. The target actor 1008, which is mathematically expressed as $\pi_t(S;\theta_t)$, performs the same function as the main actor 1004, but is configured by the weights $\theta_t$.

Likewise, the target critic 1010, which is mathematically expressed as $Q_t(S,A;\phi_t)$, performs the same function as the main critic 1006, but is configured by the weights $\phi_t$.

A circular buffer 1012 stores prior experiences, each expressed by an instance of state information, an action taken in response to the instance of state information, and the consequence of the action. A weighting-updating component 1014 updates weights of the main actor 1004, main critic 1006, target actor 1008, and target critic 1010 in a manner explained below. When a training objective is achieved, the DDPG system 1002 provides a final machine-trained model 1016, corresponding to a fully-trained version of the main actor 1004.

In one implementation, the DDPG system 1002 first initializes the machine-trained models of the main actor 1004, main critic 1006, target actor 1008, and target critic 1010 with random weights. Then, for each training iteration, the DDPG performs the following illustrative sequence of steps.

Step 1. The DDPG system 1002 uses the main actor 1004 to calculate an action A given by $A=\pi(S;\theta)+N$, where S represents a current instance of state information and N represents noise produced by a stochastic noise model. The DDPG system 1002 then executes action A. The DDPG system 1002 observes the reward R and the next instance of state information S' that results from executing the action A. The DDPG system 1002 then stores this aggregate experience (S,A,R,S') in the circular buffer 1012.

Step 2. The DDPG system 1002 extracts a random sample of M experiences from the circular buffer 1012, each of which is denoted by $(S_i,A_i,R_i,S_i')$. For each sampled experience, the DDPG system 1002 uses the target actor 1008 and target critic 1010 to produce a value function target $y_i$ given by: $y_i=R_i+\gamma Q_t(S'_i,\pi(S'_i;\phi_t);\phi t)$. In this equation, $\gamma$ is a discount factor. In other words, the DDPG system 1002 uses the target actor 1008 to compute a next action. The DDPG system 1002 then uses the target critic 1010 to compute the cumulative reward based on the next action computed by the target actor 1008.

Step 3. The weight-updating component 1014 updates the weights of the main critic by minimizing the loss L given by:

$$L = \frac{1}{M}\sum_{i=1}^{M}(y_i - Q(S_i, A_i; \phi))^2. \quad (1)$$

Step 4. The weight-updating component 1014 updates the weights of the main critic 1006 based on the equation:

$$\nabla_\theta J \approx \frac{1}{M}\sum_{i=1}^{M} Z_{ai}Z_{\pi i}, \quad (2)$$

In this equation, $Z_{ai}$ is $\nabla_A Q(S_i,A;\phi)$, where $A=\pi(S_i;\theta)$. In other words, $Z_{ai}$ is the gradient of the main critic 1006, which, in turn, depends on an action computed by the main actor 1004. $Z_{\pi i}$ is the gradient of the main actor 1004, and is given by $\nabla_\theta \pi(S_i;\theta)$.

Step 5. The weight-updating component 1014 updates the weights of the target critic 1010 based on updated weights of the main critic 1006. For example, the weight-updated component 1014 computes $\phi_t=\tau\phi+(1-\tau)\phi_t$, where $\tau$ is a smoothing factor constant. The weight-updating component 1014 also updates the weights of the target actor 1008 based on the updated weights of the main actor 1004. For example, $\theta_t=\tau\theta+(1-\tau)\theta_t$. In some implementations, the weight-updating component 1014 performs Step 5 periodically, not every training iteration.

Background information on the general topic of reinforcement learning can be found in SUTTON, et al., "Reinforcement Learning: An Introduction," 2nd Edition, 2015, MIT Press, 352 pages. Background information on the general topic of the DDPG algorithm can be found in LILLICRAP, et al., "Continuous Control with Deep Reinforcement Learning," arXiv, Cornell University, arXiv:1509.02971v6 [cs.LG], Jul. 5, 2019, 14 pages.

B. Illustrative Processes

Figure 11:
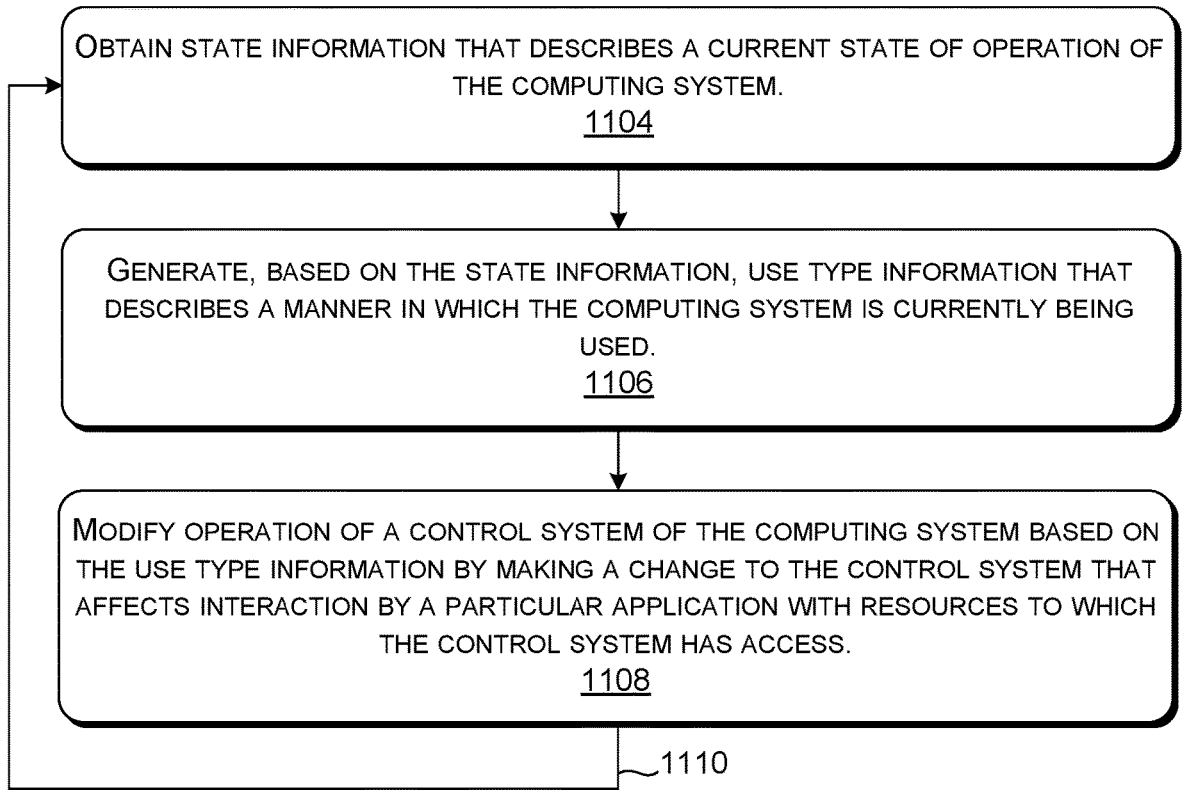
FIG. 11 shows a process that describes one manner of operation of the computing system of FIG. 1.

FIG. 11 show an illustrative process 1102 that explains one manner of operation of the computing system 106 of Section A in flowchart form. As the principles underlying the operation of the computing system 106 have already been described in Section A, certain operations will be addressed in summary fashion in this section. The flowchart is expressed as a series of operations performed in a particular order. But the order of these operations is merely representative, and varies in other implementations. Further, any two or more operations described below are capable of being performed in a parallel manner. In one implementation, the blocks shown in the flowcharts that pertain to processing-related functions are implemented by the hardware logic circuitry described in Section C, which, in turn, includes one or more processors and/or other logic units that include a task-specific collection of logic gates.

In block 1104, the computing system 106 obtains state information (e.g., state information 120) that describes a current state of operation of the computing system 106. In block 1106, the computing system 106 generates use type information (e.g., the use type information 136) based on the state information that describes a manner in which the computing system 106 is currently being used. In block 1108, the computing system 106 modifies operation of a control system (e.g., the control system 104) of the computing system 106 based on the use type information by making a change to the control system that affects interaction by a particular application with resources (e.g., the resources 108) to which the control system has access. Loop 1110 indicates that the computing system 106 repeats the process 1102 one or more times throughout a computing session.

C. Representative Computing Functionality

Figure 12:
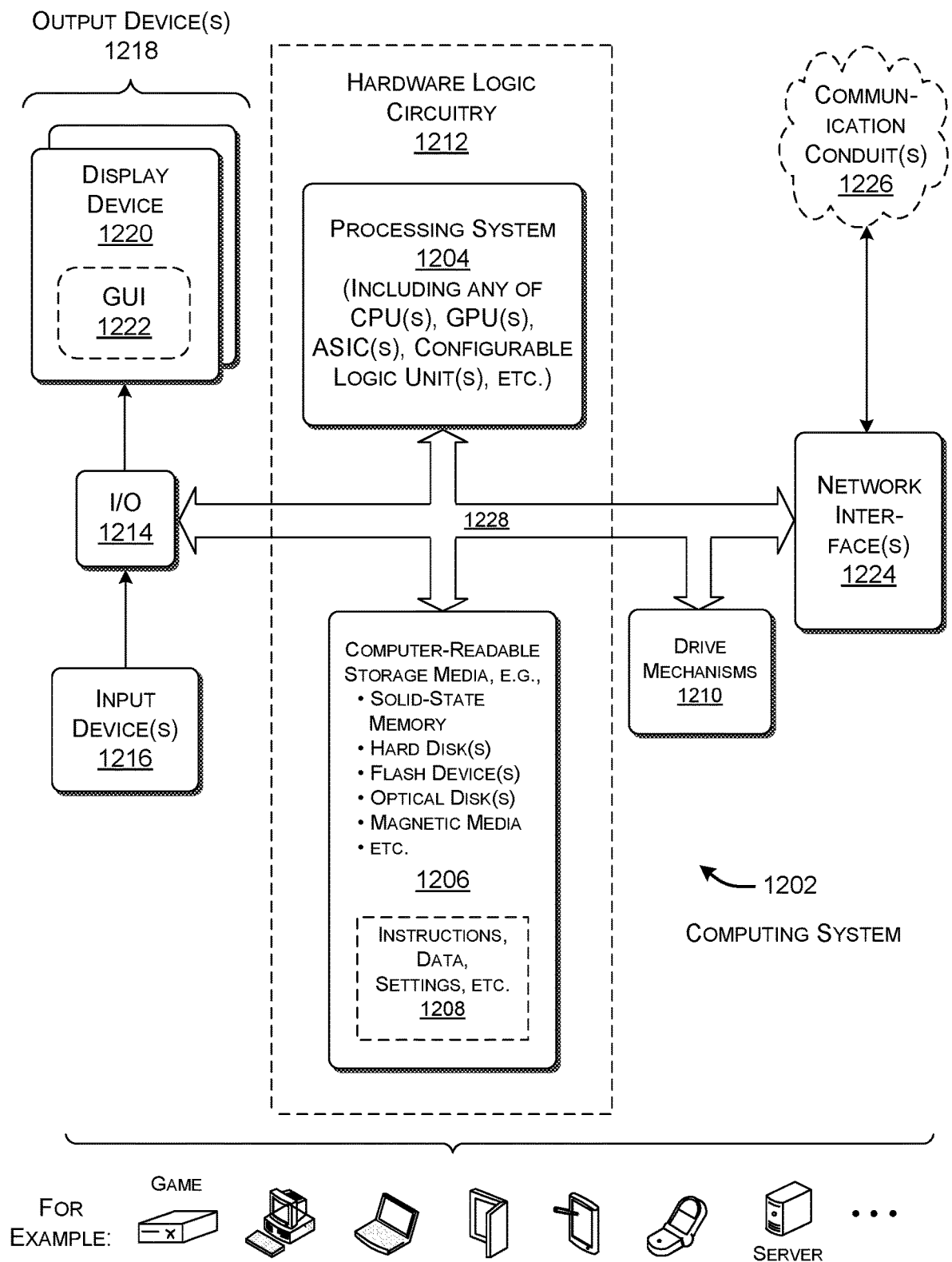
FIG. 12 shows an illustrative type of computing system that, in some implementations, is used to implement any aspect of the features shown in the foregoing drawings.

FIG. 12 shows a computing system 1202 that, in some implementations, is used to implement any aspect of the mechanisms set forth in the above-described figures. For instance, in some implementations, the type of computing system 1202 shown in FIG. 12 is used to implement any user computing device or any server shown in FIG. 4. In all cases, the computing system 1202 represents a physical and tangible processing mechanism.

The computing system 1202 includes a processing system 1204 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1202 also includes computer-readable storage media 1206, corresponding to one or more computer-readable media hardware units. The computer-readable storage media 1206 retains any kind of information 1208, such as machine-readable instructions, settings, and/or data. For example, in some implementations, the computer-readable storage media 1206 includes one or more solid-state devices, one or more magnetic hard disks, one or more optical disks, magnetic tape, etc. Any instance of the computer-readable storage media 1206 uses any technology for storing and retrieving information. Further, any instance of the computer-readable storage media 1206 represents a fixed or removable unit of the computing system 1202. Further, any instance of the computer-readable storage media 1206 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 1202 utilizes any instance of the computer-readable storage media 1206 in different ways. For example, in some implementations, any instance of the computer-readable storage media 1206 represents a hardware memory unit (such as Random Access Memory (RAM)) for storing information during execution of a program by the computing system 1202, and/or a hardware storage unit (such as a hard disk) for retaining/archiving information on a more permanent basis. In the latter case, the computing system 1202 also includes one or more drive mechanisms 1210 (such as a hard drive mechanism) for storing and retrieving information from an instance of the computer-readable storage media 1206.

In some implementations, the computing system 1202 performs any of the functions described above when the processing system 1204 executes computer-readable instructions stored in any instance of the computer-readable storage media 1206. For instance, in some implementations, the computing system 1202 carries out computer-readable instructions to perform each block of the processes described in Section B. FIG. 12 generally indicates that hardware logic circuitry 1212 includes any combination of the processing system 1204 and the computer-readable storage media 1206.

In addition, or alternatively, the processing system 1204 includes one or more other configurable logic units that perform operations using a collection of logic gates. For instance, in some implementations, the processing system 1204 includes a fixed configuration of hardware logic gates, e.g., that are created and set at the time of manufacture, and thereafter unalterable. In addition, or alternatively, the processing system 1204 includes a collection of programmable hardware logic gates that are set to perform different application-specific tasks. The latter category of devices includes, including Programmable Array Logic Devices (PALs), Generic Array Logic Devices (GALs), Complex Programmable Logic Devices (CPLDs), Field-Programmable Gate Arrays (FPGAs), etc. In these implementations, the processing system 1204 effectively incorporates a storage device that stores computer-readable instructions, insofar as the configurable logic units are configured to execute the instructions and therefore embody or store these instructions.

In some cases (e.g., in the case in which the computing system 1202 represents a user computing device), the computing system 1202 also includes an input/output interface 1214 for receiving various inputs (via input devices 1216), and for providing various outputs (via output devices 1218). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1220 and an associated graphical user interface presentation (GUI) 1222. The display device 1220 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1202 also includes one or more network interfaces 1224 for exchanging data with other devices via one or more communication conduits 1226. One or more communication buses 1228 communicatively couple the above-described units together.

The communication conduit(s) 1226 is capable of being be implemented in any manner, e.g., by a local area computer network, a wide area computer network (e.g., the Internet), point-to-point connections, or any combination thereof. The communication conduit(s) 1226 includes any combination of hardwired links, wireless links, routers, gateway functionality, name servers, etc., governed by any protocol or combination of protocols.

FIG. 12 shows the computing system 1202 as being composed of a discrete collection of separate units. In some cases, the collection of units corresponds to discrete hardware units provided in a computing device chassis having any form factor. FIG. 12 shows illustrative form factors in its bottom portion. In other cases, the computing system 1202 includes a hardware logic unit that integrates the functions of two or more of the units shown in FIG. 1. For instance, in some implementations, the computing system 1202 includes a system on a chip (SoC or SOC), corresponding to an integrated circuit that combines the functions of two or more of the units shown in FIG. 12.

The following summary provides a set of illustrative examples of the technology set forth herein.

(A1) According to a first aspect, a method is described for controlling a computing system (e.g., the computing system 106). The method includes: obtaining (e.g., in block 1104) state information (e.g., state information 120) that describes a current state of operation of the computing system; generating (e.g., in block 1106), based on the state information, use type information (e.g., the use type information 136) that describes a manner in which the computing system is currently being used; and modifying (e.g., in block 1108) operation of a control system (e.g., the control system 104) of the computing system based on the use type information by making a change to the control system that affects interaction by a particular application with resources (e.g., the resources 108) to which the control system has access.

(A2) According to some implementations of method of A1, the state information is first state information and the use type information is first use type information. The method further includes: obtaining second state information that describes an updated current state of operation of the computing system; generating second use type information based on the second state information; and modifying operation of the control system based on the second use type information.

(A3) According to some implementations of the method of A1, the state information includes an identifier associated with a user profile, and the generating produces the use type information based on the identifier.

(A4) According to some implementations of any of the methods of A1 or A3, the particular application is currently being executed by the computing system, the state information includes running process information that describes the particular application, and the generating depends on the running process information.

(A5) According to some implementations of any of the methods of A1, A3, or A4, the use type information specifies a particular use type that is selected from among a set of predetermined use types, the predetermined use types specifying differing ways of using the computing system that involve different respective uses of the resources.

(A6) According to some implementations of any of the methods of A1 or A3-A5, the modifying includes reducing use by a first process to the resources, to enable a second process, different from the first process, to run with reduced interference from the first process.

(A7) According to some implementations of any of the methods of A1 or A3-A5, the modifying includes giving a first process privileged access to an identified resource of the resources, with respect to a second process.

(A8) According to some implementations of any of the methods of A1 or A3-A7, the generating and/or the modifying uses a machine-trained model.

(A9) According to some implementations of the method of A8, the machine-trained model is customized for a particular use type, and the method further includes obtaining the machine-trained model from a source system to which the computing system has access via a computer network.

(A10) According to some implementations of the method of A9, the method further includes using the computing system to refine weights used by the machine-trained model based on training data collected by the computing system during use of the computing system.

(A11) According to some implementations of the method of A8, the machine-trained model includes weights trained by a process of reinforcement learning. At each iteration of training, the process of reinforcement leaning chooses a particular control action, executes the particular control action, and then reacts to reward information that describes current performance of the particular application.

(A12) According to some implementations of the method of A11, the reward information is based on an assessed failure rate of the particular application, following execution of the particular control action.

(A13) According to some implementations of the method of A11, the reward information is based on an indication of a change in control settings made to the control system, following execution of the particular action.

(A14) According to some implementations of the method of A8, the machine-trained model includes a first machine-trained model for implementing the generating and a second machine-trained model for implementing the modifying.

(A15) According to some implementations of the method of A8, the machine-trained model includes a single machine-trained model for implementing the generating and the modifying.

(B1) A variation of the method of A1 includes implementing the control system as an operating system. The variation includes: obtaining state information that describes a current state of operation of the computing system; generating, based on the state information, use type information that identifies a particular use type that characterizes current use of the computing system; and modifying operation of the operating system based on the use type information by making a change to the operating system that affects access by a particular application to the processing system and/or storage device, and/or which affects interaction by the computing system with a computer network.

(C1) Another variation of the method of A1 includes: obtaining state information that describes a current state of operation of the computing system; generating, based on the state information, use type information that identifies a particular use type that characterizes current use of the computing system, selected from among a set of predetermined use types, the predetermined use types specifying differing ways of using the computing system that involve different respective uses of resources to which the computing system has access; and modifying operation of the control system of the computing system based on the use type information.

In yet another aspect, some implementations of the technology described herein include a computing system (e.g., the computing system 1202) that includes a processing system (e.g., the processing system 1204) having a processor. The computing system also includes a storage device (e.g., the computer-readable storage media 1206) for storing computer-readable instructions (e.g., information 1208) that, when executed by the processing system, perform any of the methods described herein (e.g., any one of the methods of A1-A15, B1 and C1).

In yet another aspect, some implementations of the technology described herein include a computer-readable storage medium (e.g., the computer-readable storage media 1206) for storing computer-readable instructions (e.g., the information 1208). A processing system (e.g., the processing system 1204) executes the computer-readable instructions to perform any of the operations described herein (e.g., the operation in any one of the methods of A1-A15, B1 and C1).

More generally stated, any of the individual elements and steps described herein combinable, for example, into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1212 of Section C. The term "logic" likewise encompasses various physical and tangible mechanisms for performing a task. For instance, each processing-related operation illustrated in the flowchart of Section B corresponds to a logic component for performing that operation.

This description may have identified one or more features as "optional." This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities;

similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

As to specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of," is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "example" or "illustrative," and variants thereof, refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling a computing system, comprising:
   obtaining state information that describes a current state of operation of the computing system;
   generating, based on the state information, use type information that describes a manner in which the computing system is currently being used,
   the use type information specifying a particular use type that is selected from among a set of predetermined use types, the predetermined use types specifying differing ways of using the computing system that involve different respective uses of resources to which a control system of the computing system has access; and
   modifying operation of the control system based on the use type information by making a change to the control system that affects interaction by a particular application with the resources,
   wherein the generating and the modifying uses a machine-trained model, and
   wherein the machine-trained model includes a first machine-trained model for implementing the generating and a second machine-trained model for implementing the modifying, or wherein the machine-trained model includes a single machine-trained model for implementing the generating and the modifying.

2. The method of claim 1, wherein the state information is first state information and the use type information is first use type information, and wherein the method further includes:
   obtaining second state information that describes an updated current state of operation of the computing system;
   generating second use type information based on the second state information; and
   modifying operation of the control system based on the second use type information.

3. The method of claim 1, wherein the state information includes an identifier associated with a user profile, and wherein the generating produces the use type information based on the identifier.

4. The method of claim 1, wherein the particular application is currently being executed by the computing system, wherein the state information includes running process information that describes the particular application, and wherein the generating depends on the running process information.

5. The method of claim 1, wherein the modifying includes reducing use by a first process to the resources, to enable a second process, different from the first process, to run with reduced interference from the first process.

6. The method of claim 1, wherein the modifying includes giving a first process privileged access to an identified resource of the resources, with respect to a second process.

7. The method of claim 1, wherein some of the predetermined use types characterize different activities that are expected to be frequently performed using the computing system.

8. The method of claim 1, wherein some of the predetermined use types characterize different occupations for which the computing system is expected to be used.

9. The method of claim 1, further comprising forming a feature vector that describes features specified by the state information,
   wherein the generating use type information includes mapping the feature vector into a latent type vector in a vector space that semantically characterizes the particular use type, and
   wherein the modifying operation of the control system includes generating control settings based on the latent type vector and the state information.

10. A computing system, comprising:
    a processing system comprising a processor and an operating system; and
    a storage device for storing machine-readable instructions that, when executed by the processing system, perform operations comprising:
    obtaining state information that describes a current state of operation of the computing system;

generating, based on the state information, use type information that identifies a particular use type that characterizes current use of the computing system; and modifying operation of the operating system based on the use type information by making a change to the operating system that affects access by a particular application to the processing system and/or the storage device, and/or which affects interaction by the computing system with a computer network, the particular use type being selected from among a set of predetermined use types, the predetermined use types specifying differing ways of using the computing system that involve different respective uses of the processing system and/or the storage device, and/or different ways of interacting with the computer network, the generating and/or the modifying using a machine-trained model, and the machine-trained model being customized for the particular use type, wherein the machine-trained model is customized for the particular use type, and wherein the method further includes obtaining the machine-trained model from a source system to which the computing system has access via a computer network.

11. The computing system of claim 10, further including using the computing system to refine weights used by the machine-trained model based on training data collected by the computing system during use of the computing system.

12. The computing system of claim 10, wherein the particular application is currently being executed by the computing system, wherein the state information includes running process information that describes the particular application, and wherein the generating depends on the running process information.

13. A computer-readable storage medium for storing computer-readable instructions, wherein a processing system executing the computer-readable instructions performs operations comprising:

obtaining state information that describes a current state of operation of a computing system;

generating, based on the state information, use type information that identifies a particular use type that characterizes current use of the computing system, selected from among a set of predetermined use types, the predetermined use types specifying differing ways of using the computing system that involve different respective uses of resources to which the computing system has access, and some of the predetermined use types characterizing different activities that are expected to be frequently performed using the computing system; and modifying operation of a control system of the computing system based on the use type information, wherein the generating and/or the modifying uses a machine-trained model, wherein the machine-trained model includes weights trained by a process of reinforcement learning, and wherein, at each iteration of training, the process of reinforcement leaning chooses a particular control action, executes the particular control action, and then reacts to reward information that describes current performance of the particular application.

14. The computer-readable storage medium of claim 13, wherein the state information includes running process information that describes a particular application that is currently being executed by the computing system, and wherein the generating depends on the running process information.

15. The computer-readable storage medium of claim 13, wherein the reward information is based on an assessed failure rate of the particular application, following execution of the particular control action.

16. The computer-readable storage medium of claim 13, wherein the reward information is based on an indication of a change in control settings made to the control system, following execution of the particular action.

\* \* \* \* \*